United States Patent
Jamison et al.

(10) Patent No.: US 12,174,102 B2
(45) Date of Patent: Dec. 24, 2024

(54) OPTICAL FLUIDIC METHODS FOR A RHEOMETER

(71) Applicant: Halliburton Energy Services, Inc., Houston, TX (US)

(72) Inventors: Dale E. Jamison, Humble, TX (US); Sandeep D. Kulkarni, Kingwood, TX (US); John L. Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 361 days.

(21) Appl. No.: 17/309,592

(22) PCT Filed: Jan. 31, 2019

(86) PCT No.: PCT/US2019/016121
§ 371 (c)(1),
(2) Date: Jun. 8, 2021

(87) PCT Pub. No.: WO2020/159523
PCT Pub. Date: Aug. 6, 2020

(65) Prior Publication Data
US 2022/0018750 A1  Jan. 20, 2022

(51) Int. Cl.
*G01N 11/14*  (2006.01)
(52) U.S. Cl.
CPC ................... *G01N 11/14* (2013.01)
(58) Field of Classification Search
CPC ...... G01N 11/14; G01N 11/16; G01N 11/142; G01N 11/162; G01N 11/10; G01N 11/165; G01N 11/167; G01N 2011/145
(Continued)

(56) References Cited

U.S. PATENT DOCUMENTS

| | | | | |
|---|---|---|---|---|
| 2,382,979 A | * | 8/1945 | Demb | G01N 11/14 73/54.32 |
| 2,643,543 A | * | 6/1953 | Herzog | G01N 11/14 73/54.32 |

(Continued)

FOREIGN PATENT DOCUMENTS

| | | | | |
|---|---|---|---|---|
| CA | 3048811 A1 | * | 10/2018 | ............. G01N 11/14 |
| CN | 1414350 A | * | 4/2003 | ............. G01N 11/14 |

(Continued)

OTHER PUBLICATIONS

ESPACENET Machine Translation of DE 3844294 A1 Which Originally Published On Jul. 5, 1990. (Year: 1990).*

(Continued)

*Primary Examiner* — Nathaniel T Woodward
(74) *Attorney, Agent, or Firm* — K&L Gates LLP

(57) ABSTRACT

Systems and methods of the disclosed embodiments include a rheometer having a housing with a fluid inlet and a fluid outlet, a cylinder with a cavity located to receive fluid that passes into the fluid inlet, a motor configured to rotate the cylinder, a torsion bob within the cavity, and a controller located remotely from the rheometer. The controller includes a pressure regulator configured to pressurize fluid to power the motor, a rotation sensor configured to receive an optical rotation signal indicating a rotation speed of the cylinder, and a torque sensor configured to receive an optical signal indicating a torque on the torsion bob. The controller may be configured to receive a rotation speed signal from the rotation sensor, a torque signal from the torque sensor, and to calculate a shear stress for the fluid based on the rotation speed signal and the torque signal.

17 Claims, 5 Drawing Sheets

(58) Field of Classification Search
USPC ..................................................... 73/54.28
See application file for complete search history.

(56) References Cited

U.S. PATENT DOCUMENTS

| | | | | |
|---|---|---|---|---|
| 2,817,231 A * | 12/1957 | Barstow | G01N 11/14 | 73/54.33 |
| 2,917,065 A * | 12/1959 | Monk | G01N 11/14 | 73/54.32 |
| 2,977,790 A * | 4/1961 | Dubsky | G01N 11/14 | 73/54.35 |
| 3,239,325 A * | 3/1966 | Roberson | G01N 11/14 | 73/54.28 |
| 3,587,295 A * | 6/1971 | Simons | G01N 33/4905 | 73/54.41 |
| 3,667,286 A * | 6/1972 | Kaufman | G01N 11/14 | 73/54.32 |
| 3,777,551 A * | 12/1973 | Weiss | G01N 11/14 | 73/54.28 |
| 3,935,726 A * | 2/1976 | Heinz | G01N 11/14 | 73/54.35 |
| 4,062,225 A * | 12/1977 | Murphy, Jr. | G01N 11/14 | 388/933 |
| 4,074,561 A * | 2/1978 | Brockschmidt | G01N 11/10 | 73/847 |
| 4,077,252 A * | 3/1978 | Stutz | G01N 11/14 | 250/230 |
| 4,092,849 A * | 6/1978 | Maxwell | G01N 3/24 | 73/846 |
| 4,175,425 A * | 11/1979 | Brookfield | G01N 11/14 | 73/54.35 |
| 4,202,204 A * | 5/1980 | Hartert | G01N 11/162 | 73/64.42 |
| 4,347,734 A * | 9/1982 | Heinz | G01N 11/14 | 73/54.35 |
| 4,448,061 A * | 5/1984 | Brookfield | G01N 11/14 | 73/54.35 |
| 4,524,611 A * | 6/1985 | Richon | G01N 11/14 | 73/54.35 |
| 4,557,142 A * | 12/1985 | Hensley | E21B 49/005 | 73/54.32 |
| 4,648,263 A * | 3/1987 | Deysarkar | G01N 11/14 | 73/54.35 |
| 4,760,734 A * | 8/1988 | Maxwell | G01N 11/14 | 73/54.35 |
| 5,301,541 A * | 4/1994 | Joseph | G01M 10/00 | 73/54.32 |
| 5,315,864 A * | 5/1994 | Surjaatmadja | G01N 11/14 | 73/54.32 |
| 5,513,517 A * | 5/1996 | Van Meter | G01N 11/14 | 279/2.03 |
| 5,604,300 A * | 2/1997 | Sayers | G01N 11/14 | 73/54.35 |
| 5,763,766 A * | 6/1998 | Robinson | G01N 11/14 | 73/54.33 |
| 5,802,248 A * | 9/1998 | Miiller | G01N 11/14 | 388/822 |
| 5,987,970 A * | 11/1999 | Ball | G01N 11/14 | 73/54.28 |
| 6,240,770 B1 * | 6/2001 | Raffer | B01L 7/00 | 73/54.23 |
| 6,257,051 B1 * | 7/2001 | Boyle | G01N 11/14 | 73/54.35 |
| 6,412,338 B2 * | 7/2002 | Boyle | B05B 14/43 | 73/54.35 |
| 6,535,796 B1 * | 3/2003 | Sierro | G01N 11/14 | 700/285 |
| 6,840,305 B2 * | 1/2005 | Zheng | G01N 11/14 | 165/138 |
| 6,928,860 B1 * | 8/2005 | Hildebrandt | G01N 11/00 | 73/54.28 |
| 6,951,127 B1 * | 10/2005 | Bi | G01N 11/162 | 73/54.23 |
| 7,235,136 B2 * | 6/2007 | Dobrowolski | G01P 3/486 | 250/559.49 |
| 7,275,419 B2 * | 10/2007 | Raffer | G01N 11/142 | 73/54.01 |
| 7,373,804 B1 * | 5/2008 | Hildebrandt | G01N 11/14 | 73/54.28 |
| 7,578,171 B2 * | 8/2009 | Manneville | G01N 29/02 | 73/54.23 |
| 7,594,429 B2 * | 9/2009 | Liberatore | G01N 11/14 | 73/54.23 |
| 7,624,625 B2 * | 12/2009 | Jau | G01N 11/14 | 366/64 |
| 7,810,893 B2 * | 10/2010 | Na | G01N 11/14 | 347/6 |
| 7,992,427 B2 * | 8/2011 | Tonmukayakul | G01N 11/14 | 73/54.38 |
| 8,024,962 B2 * | 9/2011 | Tonmukayakul | G01N 11/14 | 73/61.68 |
| 8,230,723 B2 * | 7/2012 | Moon | G01N 11/14 | 73/54.32 |
| 8,347,693 B2 * | 1/2013 | Pindiprolu | G01N 11/14 | 73/54.23 |
| 8,844,363 B2 * | 9/2014 | Delatorre | G01L 9/0052 | 73/732 |
| 8,850,874 B1 * | 10/2014 | Bi | G01N 11/14 | 73/54.28 |
| 8,904,852 B2 * | 12/2014 | Wollny | G01N 11/142 | 73/54.32 |
| 9,267,871 B2 * | 2/2016 | Sierro | G01N 11/142 | |
| 9,372,141 B2 * | 6/2016 | Yasuda | G01N 11/14 | |
| 9,702,800 B2 * | 7/2017 | Morgan | G01N 11/14 | |
| 9,726,589 B2 * | 8/2017 | Zamora | G01N 11/14 | |
| 10,247,583 B2 * | 4/2019 | Schade | G01D 5/3538 | |
| 10,444,134 B2 * | 10/2019 | Gajji | G01N 11/14 | |
| 10,598,582 B2 * | 3/2020 | Franck | G01N 11/14 | |
| 10,697,876 B1 * | 6/2020 | Jamison | G01N 11/14 | |
| 10,895,520 B2 * | 1/2021 | Ziegler | G01N 11/142 | |
| 2003/0154772 A1 * | 8/2003 | Jackson | G01N 11/14 | 73/54.28 |
| 2007/0193343 A1 | 8/2007 | Liberatore et al. | | |
| 2007/0197851 A1 * | 8/2007 | Rogers | E21B 21/066 | 588/250 |
| 2010/0071442 A1 * | 3/2010 | Moon, Jr. | G01N 11/14 | 73/54.28 |
| 2014/0260560 A1 | 9/2014 | Zamora | | |
| 2016/0047727 A1 * | 2/2016 | Franck | G01N 11/16 | 73/54.28 |
| 2017/0205325 A1 * | 7/2017 | Gil | G01N 11/14 | |
| 2019/0271627 A1 * | 9/2019 | Ziegler | G01N 11/142 | |

FOREIGN PATENT DOCUMENTS

| | | | | |
|---|---|---|---|---|
| CN | 208636334 U | * | 3/2019 | |
| DE | 3844294 A1 | * | 7/1990 | G01N 11/142 |
| GB | 852026 A | * | 10/1960 | |
| GB | 2066483 A | * | 7/1981 | G01N 11/14 |
| GB | 2482908 A | * | 2/2012 | G01N 11/00 |
| JP | 04016742 A | * | 1/1992 | |
| KR | 20150134832 A | * | 12/2015 | G01N 11/142 |
| WO | 2016148704 A1 | | 9/2016 | |
| WO | 2016153517 A1 | | 9/2016 | |

OTHER PUBLICATIONS

ESPACENET Machine Translation of CN 208636334 U Which Originally Published On Mar. 22, 2019. (Year: 2019).*
ESPACENET Machine Translation of JP H 0416742 A Which Originally Published On Jan. 21, 1992. (Year: 1992).*
International Search Report and Written Opinion dated Oct. 29, 2019 for PCT Application No. PCT/US2019/016121, filed Jan. 31, 2019 (11 pages).

* cited by examiner

OPTICAL FLUIDIC METHODS FOR A RHEOMETER

BACKGROUND

Rheometers typically require electrical connections to send and receive signals. For example, a rheometer may make a rheological measurement which is then sent to a database or processor for further interpretation of the data points. Furthermore, rheometers typically require electrical connections to drive mechanical components such as a fluid pump or valve to keep a testing fluid flowing, or to perform the tests on the fluid. Such electrical connections, however, can cause problems in certain locations.

For example, certain atmospheres may develop concentrations of dusts or vapors that can be volatile or detrimental to operation of devices. Governmental bodies have criteria for classifying such locations as "hazardous locations." The criteria may include locations where: ignitable concentrations of flammable gases or vapors may exist under normal operating conditions; ignitable concentrations of such gases or vapors may exist frequently because of repair or maintenance operations or because of leakage; or breakdown or faulty operation of equipment or processes might release ignitable concentrations of flammable gases or vapors, and might also cause simultaneous failure of electric equipment. Hazardous locations such as these might exist in oil and gas production, aircraft hangars, gasoline stations, paint-finishing locations, or grain bins.

Equipment used in hazardous locations is subject to enhanced requirements such as special wiring and protective electrical components. These restrictions can make it difficult to obtain rheological information from fluids in particular locations.

DETAILED DESCRIPTION

Due to the restrictions placed on electrical connections and devices operating in controlled locations (e.g., governmentally classified hazardous locations), rheological information can be difficult to obtain from fluids located in controlled locations. The embodiments described below include rheometers that do not use electrical connections. Rather, the rheometers use optical signals and air pressure originating from a safe location to communicate with and drive mechanical components in the controlled location. The optical signals may communicate through fiber optics, and the air pressure may drive rotating motors for testing a fluid within the rheometer.

Figure 1:
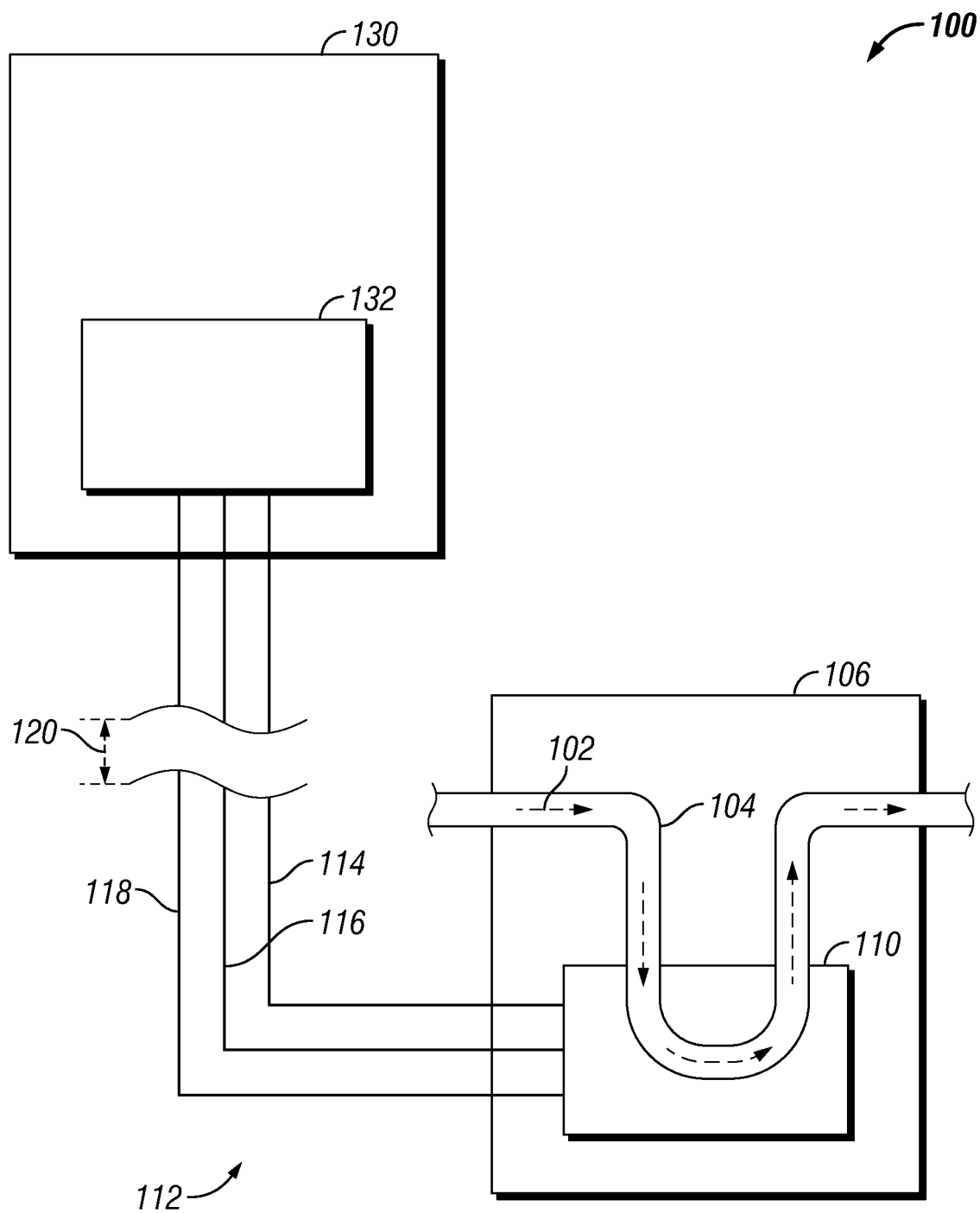
FIG. 1 is a schematic view of an embodiment of a system for monitoring the rheological properties of a fluid.

FIG. 1 is a schematic view of an embodiment of a system 100 for monitoring rheological properties of a fluid 102. The fluid 102 flows through a flow control 104 (e.g., pipeline, hose, pipe, etc.), at least part of which is located in a controlled location 106 (e.g., a rig site, mud pit, mud pit room). The controlled location 106 may be governmentally classified as a hazardous location, and thus subject to enhanced restrictions for devices used inside. In certain embodiments, any accessible portion of the flow control 104 is located entirely in the controlled location 106. For example, the fluid 102 may include drilling mud being used in an oil production wellbore (during or after drilling) such that the flow control 104 is located inaccessibly downhole, or near production fluid in a controlled location 106. Real time measurements of the rheological properties of the fluid 102 are nevertheless very useful, and thus it is beneficial to have rheological measurement within the controlled location 106.

To perform the rheological measurements, the controlled location 106 includes a rheometer 110 that tests the fluid 102. The rheometer 110 may be installed in-line with the flow control 104, and additionally or alternatively may be located in a diverted portion of the flow control 104. The rheometer 110 does not include electrical connections, but rather includes power and communication from lines 112. The rheometer 110 may receive any number of lines 112, and the system 100 of FIG. 1 includes three lines 112. A fluid line 114; a rotation monitoring fiber 116; a torque monitoring fiber 118.

The lines 112 extend a distance 120 away from the controlled location 106. The distance 120 may be several hundred feet (100 meters) to a safe area 130 that has a controller 132. In alternative or additional embodiments, the safe area 130 is located within an insulated or explosion-proof box proximate the controlled location 106. In these embodiments the distance 120 is short, for example a few feet (1-2 meters). The rheometer 110 is typically not included in the explosion-proof box that has a flash arrester because governmental regulations often will not permit drilling fluids with suspended weighting material to move into and out of an explosion proof box.

The safe area 130 does not have restrictions and thus any device with an electrical connection is located within the safe area 130. A controller 132, for example, is located within the safe area 130 and includes any processors, memory, computer storage, or other components with electrical processing capabilities for recording and controlling the mechanical components within the controlled location 106.

Figure 2:
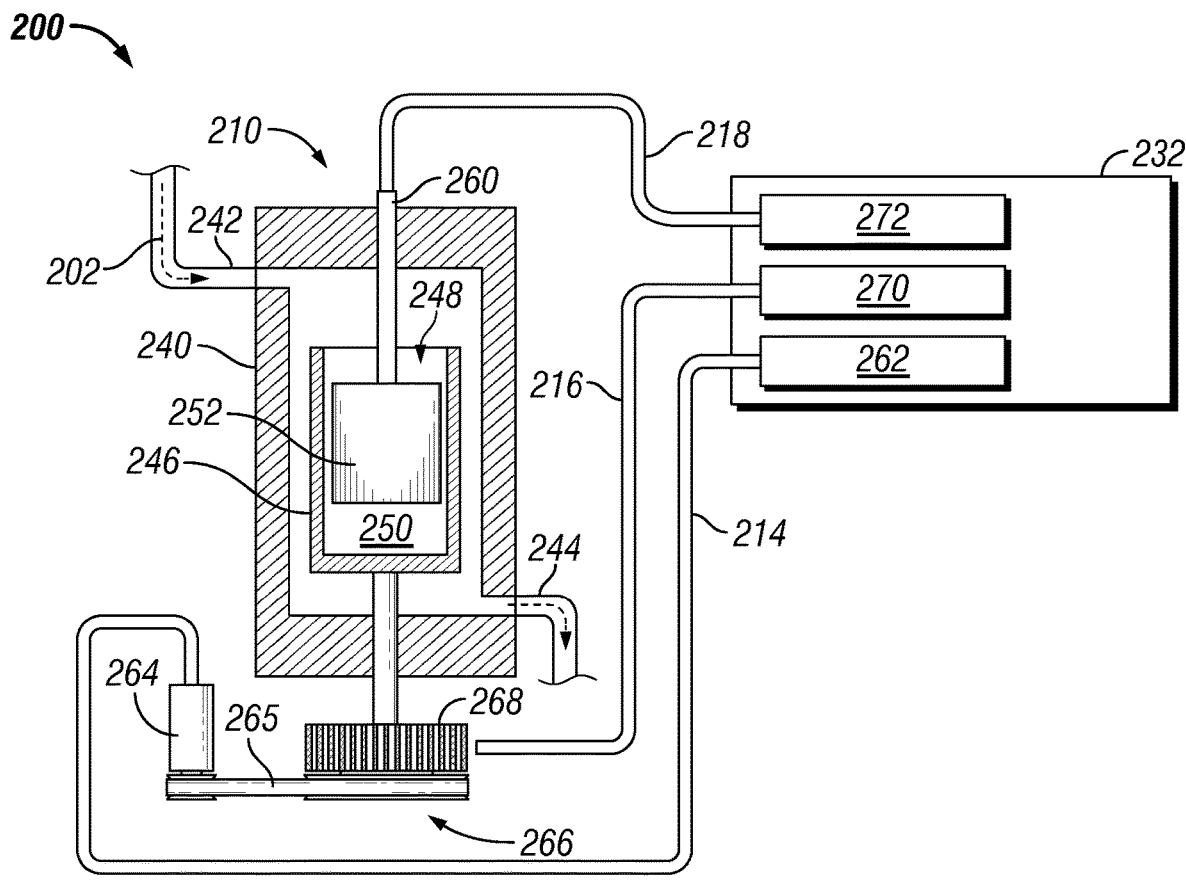
FIG. 2 is a cross-sectional and schematic view of rheological measurement system for use within a hazardous location.

FIG. 2 is a cross-sectional schematic view of an embodiment of a rheology measurement system 200 having a rheometer 210 for use within a hazardous location (e.g., controlled location 106). The rheometer 210 tests a fluid 202 that may be flowing, for example during a drilling operation. The fluid 202 may include drilling mud, water, oil or other hydrocarbon production fluids, or other liquids or gases. The fluid 202 enters a housing 240 having a fluid inlet 242 and a fluid outlet 244. In various circumstances of the operation of the rheometer 210, the fluid 202 may continuously flow through the housing 240, or may intermittently stop flowing while the rheological tests are conducted.

To conduct the rheological tests, the system 200 rotates a cylinder 246 that has an opening 248 at the top of a cavity 250. One of ordinary skill in the art will know that the cylinder 246 may include other geometries such as cone and plate, parallel plate, and vane without leaving the spirit of the embodiments disclosed herein. As the fluid 202 flows into the housing 240 from the fluid inlet 242, it fills the cavity 250. The cavity 250 also contains a torsion bob 252 that is surrounded by the fluid 202 when the cavity 250 is filled. The rotation of the cylinder 246 imparts a force into the fluid 202 that is between the cylinder 246 and the torsion bob 252. The fluid 202 in turn imparts a force onto the torsion bob 252. Furthermore, in certain embodiments the cylinder 246 remains stationary while the torsion bob 252 is rotated. The rheological properties of the fluid determine the amount of the force that is imparted on the torsion bob 252. This force is measured as a torque on a detecting element 260 that is attached to the housing 240 and the torsion bob 252. The detecting element 260 communicates any detected torque to a controller 232 through a monitoring fiber 218. Additionally or alternatively, the detecting element 260 includes an optical temperature sensor that communicates a temperature of the fluid 202 within the housing 240 optically through the monitoring fiber 218. The monitoring fiber 218 utilizes, for example, a fiber optic cable, an optical encoder, a fiber grating (e.g., Bragg grating), or multiple fiber optic cables, optical encoders, and fiber gratings containing optical fibers within a protective coating.

A controller 232 controls the operation of the rheometer 210 by sending and receiving non-electrical signals to and from the rheometer 210. The controller 232 is connected to the rheometer 210 through a fluid line 214, a rotation monitoring fiber 216, and the monitoring fiber 218. The fluid line 214 conveys pressurized fluid from a pressure regulator 262 within the controller 232 to a fluid motor 264 located proximate the rheometer 210. The fluid may include any fluid (e.g., water, hydraulic oil, air, etc.) that may be pressurized. The fluid motor 264 is powered by the pressurized fluid to rotate the cylinder 246. Certain embodiments may have a belt 265 or other speed reduction system, or a monitoring wheel 266, while other embodiments may have the fluid motor 264 directly coupled to the cylinder 246.

In the illustrated embodiment, the monitoring wheel 266 includes reflectors 268 that reflect a light signal from the rotation monitoring fiber 216. The light signal is generated at a rotation monitor 270. The rotation monitor 270 generates the light signal as a constant beam of light or intermittent pulses of light that travel through the rotation monitoring fiber 216 to the monitoring wheel 266. As the monitoring wheel 266 rotates, the reflectors 268 reflect the light signal back through the rotation monitoring fiber 216 to the rotation monitor 270. The rotation speed of the monitoring wheel 266 affects the speed, intensity, or pattern at which the light signal is reflected. The rotation monitor 270 detects the speed, intensity, and pattern of the reflected light signal and determines a speed of rotation for the monitoring wheel 266, and therefore the cylinder 246 within the rheometer 210.

Based on the determined speed of rotation, the controller 232 increases or decreases the pressure provided by the pressure regulator until the fluid motor 264 rotates the cylinder 246 at a desired rotation speed (e.g., shear rate of the fluid 202). The desired rotation speed may include, for example, 3, 6, 100, 200, 300, and 600 revolutions per minute. Once the correct rotation speed is achieved, a torque sensor 272 monitors the monitoring fiber 218, which reads the torque imparted on the torsion bob 252 by the fluid 202. The torque sensor 272 sends and receives light signals or other non-electrical signals to monitor the torque. After the torque is detected by the torque sensor 272, the controller 232 may change the rotation speed/shear rate of the cylinder 246 and measure additional torques on the torsion bob 252.

Figure 3:
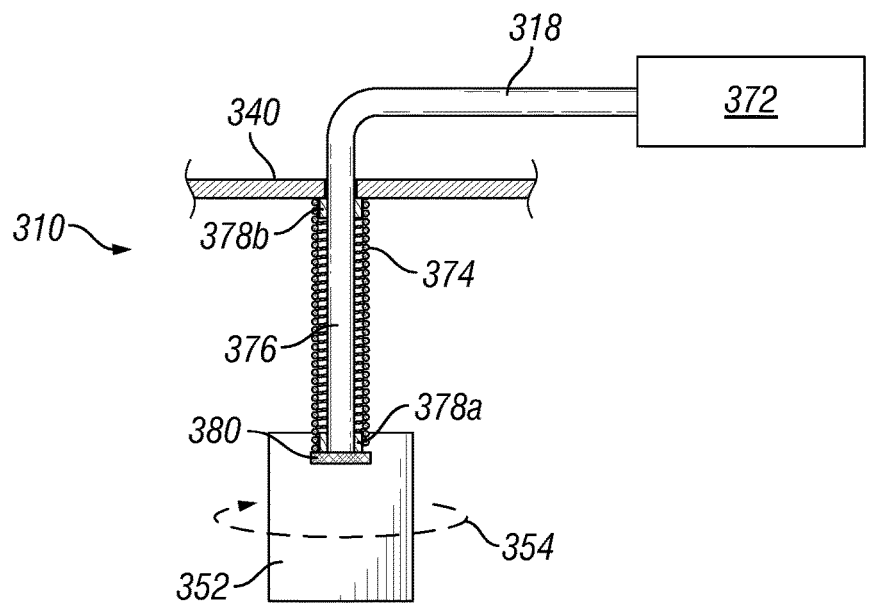
FIG. 3 is a cross-sectional side view illustrating an embodiment of a rheometer for use within the rheological monitoring system of FIG. 1.

FIG. 3 is a cross-sectional side view illustrating an embodiment of a rheometer 310 for use within a hazardous location (e.g., controlled location 106). The rheometer 310 includes a torsion bob 352 that receives a rotational force from a rotating fluid within the rheometer 310. A monitoring fiber 318 is connected between the torsion bob 352 and a torque sensor 372 that sends and receives optical signals (e.g., light pulses) through the monitoring fiber 318. The rheometer 310 also includes a mirror 380 that reflects the signals sent by the torque sensor 372 through the monitoring fiber 318 back through the monitoring fiber 318 to the torque sensor 372.

The rotational force on the torsion bob 352 rotates the torsion bob 352 in a direction 354 until the rotation force is balanced by a torsion spring element 374 that surrounds the monitoring fiber 318. A strain sensor 376 is a portion of the monitoring fiber 318 that is secured between fiber securing points at the torsion bob 352 (point 378a) and at a housing 340 of the rheometer 310 (point 378b). Thus, any rotation of the torsion bob 352 results in rotation of the strain sensor 376. The strain sensor 376 includes stress elements that change the signal propagating from the torque sensor 372 through the monitoring fiber 318. The stress elements include, for example, attenuating elements that reduce the strength of the optical signal based on how much the strain sensor 376 is rotated. That is, if the strain sensor 376 is rotated further, the signal from the torque sensor will be further attenuated. The torsion spring element 374 and the torque sensor 372 are thus calibrated to establish the relationship between signal attenuation and a torque on the torsion bob 352.

Figure 4:
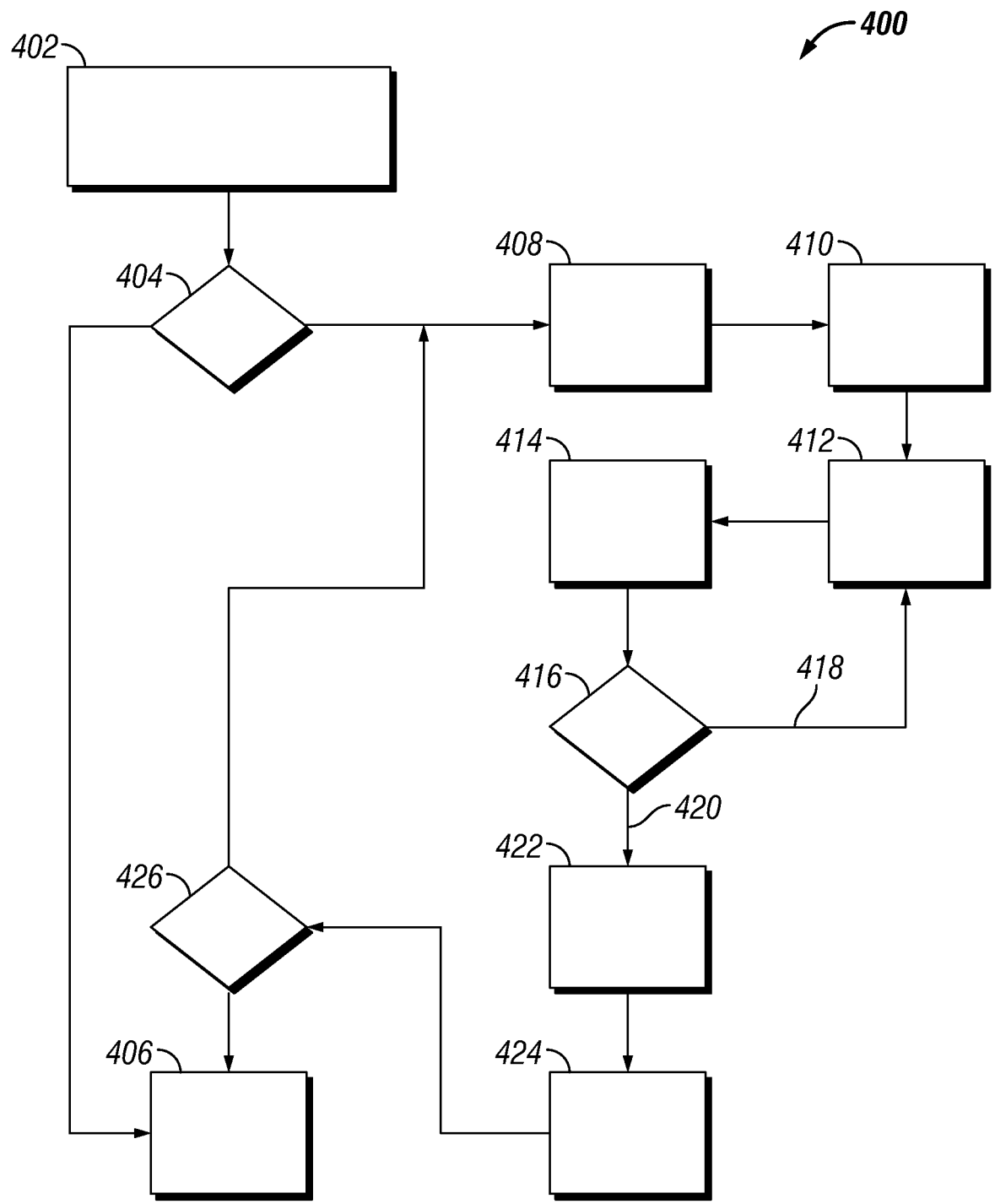
FIG. 4 is a flow chart of an embodiment of a method that may be used to monitor the rheological properties of a fluid within a hazardous location

FIG. 4 is a flow chart of an embodiment of a method 400 that may be used to monitor the rheological properties of a fluid within a hazardous location. The method 400 is used, for example, by the controllers (e.g., 132, 232) above to determine a torque and a shear stress for a fluid within a rheometer. At step 402 the method starts and then asks 404 whether it is time to test the fluid for the torque and/or shear stress. If it is not time, the method 400 ends 406. If it is time to test, the method 400 sets 408 a desired shear rate. The shear rate depends on the rotation speed and the geometry of the cylinder within the rheometer. Once the shear rate is set, the method rotates 410 the cylinder and the fluid, which imparts a force on the torsion bob. The cylinder is rotated without sending electrical signals. For example, the cylinder is rotated using a fluid motor that receives a pressurized fluid from a safe area outside of the hazardous location. The method 400 monitors 412 a speed of rotation of the cylinder and adjusts 414 the pressure delivered to the fluid motor. The monitoring 412 can be done optically using a monitoring fiber and an optical signal reflecting from the rheometer. The method 400 will ask 416 whether the shear rate has been achieved, and if not 418 the method 400 will monitor 412 and adjust 414 the pressure again until the correct rotation speed for the shear rate is achieved 420.

Once the correct shear rate is reached, the method 400 determines 422 the shear stress as a function of the shear rate. The shear stress is measured as dependent upon a torque on a torsion bob within the rheometer. The torque is measured, for example, by the rheometer 310 described above. Specifically, a controller (e.g., controller 132, 232, or torque sensor 372) may send a signal (e.g., light pulse) through a fiber (e.g., 318) to the rheometer 310. The signal returns to the controller with an adjustment that indicates a torque imparted on the rheometer 310. In response to the determining the shear stress as a function of the shear rate, the method 400 includes changing 424 operating parameters for a drilling operation in order to stay within an operating window for a drilling operation. The operating window is the pressure range that is acceptable for drilling a wellbore, and is determined largely by the rheological properties of the fluid in the wellbore. The lower pressure limit is driven by the formation pore pressure which depends largely on the lithology and depth of the formation. Thus, the pressure exerted by the drilling fluid must be higher to prevent formation fluid influx. The lower limit may also be impacted by the required mud weight to support the wellbore and to prevent wellbore collapse. The upper pressure limit is commonly known as the "fracture gradient" which depends largely on the wellbore trajectory, formation properties and formation stresses. When the shear stress for the first shear rate is determined, the method 400 includes asking 426 whether another shear rate test is desired. If yes, the method 400 starts again, if no, the method ends 406.

Figure 5:
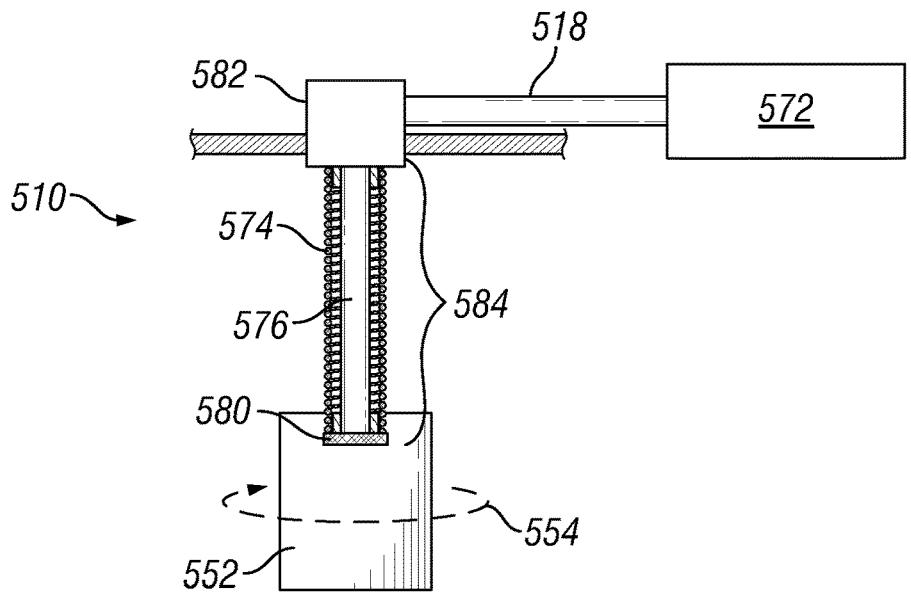
FIG. 5 is a cross-sectional side view illustrating a second embodiment of a rheometer for use within rheological monitoring system of FIG. 1.

FIG. 5 is a cross-sectional side view illustrating an embodiment of a rheometer 510 for use within a hazardous location (e.g., controlled location 106 of FIG. 1). The rheometer 510 may be used to measure a torque to determine a shear rate as according to the method 400 of FIG. 4 and includes a torsion bob 552 that receives a rotational force from a rotating fluid within the rheometer 510. A monitoring fiber 518 is connected between a rotary joint 582 and a torque sensor 572 that sends and receives optical signals through the monitoring fiber 518. The rheometer 510 also includes a strain sensor 576 that is a portion of the monitoring fiber 518 between the rotary joint 582 and the torsion bob 552. As with strain sensor 376 above, the strain sensor 576 includes a mirror 580 and a torsion spring element 574. The strain sensor 576 is rotatably coupled to the torsion bob 552 and the rotary joint 582, however, such that when the torsion bob 552 is rotated, the strain sensor 576 does not rotate. For example, the torsion spring element 574 may change a length 584 of the strain sensor 576 rather than rotating the strain sensor 576. That is, a rotation in the rotation direction 554 due to the force from the fluid may extend the length 584, or contract the length 584. Changing the length 584 of strain sensor 576 changes the signal from the torque sensor 572 by attenuating the signal, changing the spectrum of the signal, changing the timing of the return of the signal, changing an encoding of the signal, or other adjustments.

Figure 6A:
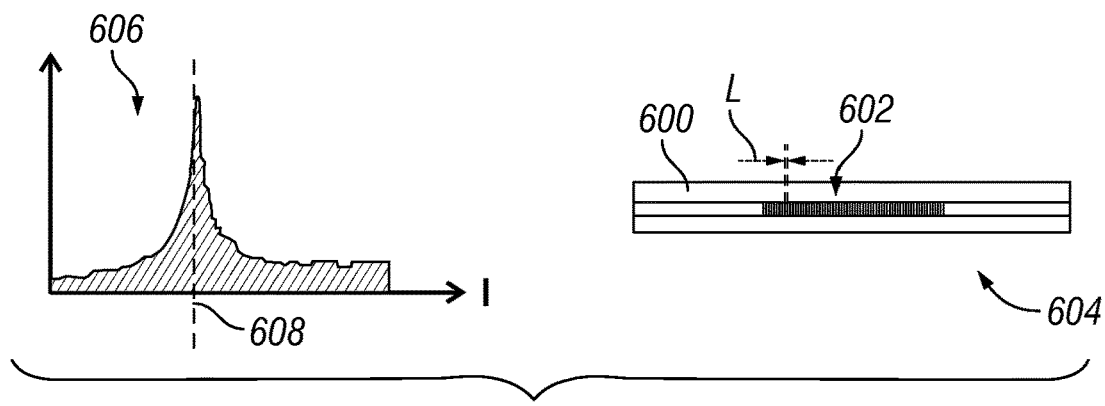
FIGS. 6A and 6B are schematic views of fiber optic cables having fiber Bragg grating that may be used to adjust a light signal within a rheometer.
Figure 6B:
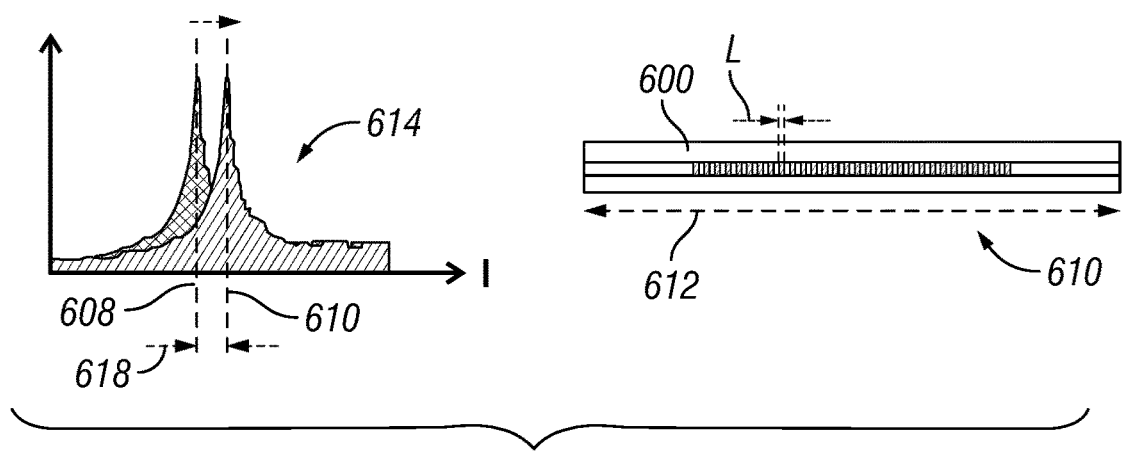

As one example, the strain sensor 576 may include a fiber Bragg grating that propagates a light pulse through the strain sensor 576 at a primary wavelength. FIGS. 6A and 6B are schematic views of a fiber optic cable 600 having a Bragg grating 602 that may be used as part of the strain sensor 576 of FIG. 5. At a first position 604, the fiber optic cable 600 is unstrained and a light signal transmitted through has a first signature 606 having a first primary wavelength 608. At a second position 610, the fiber optic cable 600 is strained to increase a length 612. The light signal that propagates through the fiber optic cable 600 in the strained position will have a second signature 614 with a second primary wavelength 616. A difference 618 may be detected, for example, by the torque sensor 572 of FIG. 5, and used to determine a degree of rotation by the torsion bob 552.

Figure 7:
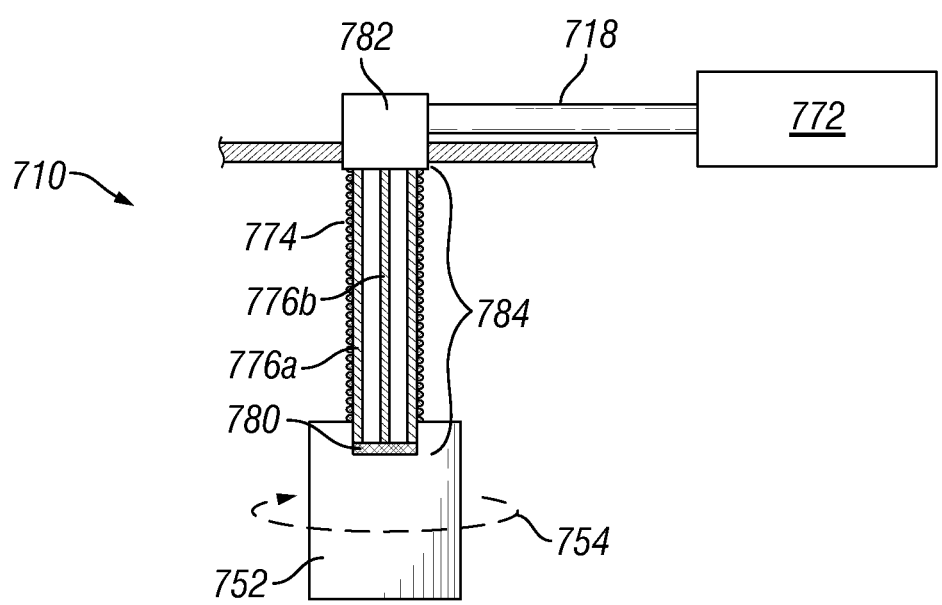
FIG. 7 is a cross-sectional side view illustrating a third embodiment of a rheometer for use within rheological monitoring system of FIG. 1.

FIG. 7 is a cross-sectional side view illustrating an embodiment of a rheometer 710 for use within a hazardous location (e.g., controlled location 106 of FIG. 1). As with the embodiments described previously, the rheometer 710 includes a torsion bob 752 that receives a rotational force from a rotating fluid within the rheometer 710. A monitoring fiber 718 is connected between a rotary joint 782 and a torque sensor 772 that sends and receives optical signals through the monitoring fiber 718. The rheometer 710 includes a first strain sensor 776a that is rotatably coupled to the torsion bob 752 and a second strain sensor 776b that rotates with the torsion bob 752. A light pulse is sent from the torque sensor 772 that passes through the first strain sensor 776a and the second strain sensor 776b simultaneously, bounces off a mirror 780, and returns to the torque sensor 772.

The combination of the first strain sensor 776a and the second strain sensor 776b can enable more precise rheological measurement of the fluid within the rheometer 710. For example, the first strain sensor 776a or the second strain sensor 776b may include a fiber Bragg grating as described above. If the fiber Bragg grating is incorporated into the second strain sensor 776b, the rotation of the strain sensor 776b elongates (or contracts) the Bragg grating to adjust the primary wavelength of the light pulse. If the fiber Bragg grating is incorporated into the first strain sensor 776a, the fiber Bragg grating may be lengthened or contracted by a torsion spring element 774.

Additionally or alternatively, the first strain sensor 776a may detect temperature changes within the rheometer 710. For example, the torsion spring element 774 may not extend or contract with the rotation of the torsion bob 752, and thus the first strain sensor 776a extends or contracts instead based on the conditions within the rheometer 710. For example, a higher temperature within the rheometer 710 may extend the first strain sensor 776a. The extending of a length 784 of the first strain sensor 776a due to conditions, and the accompanying adjustment to the light pulse, may be compared with a change in the light pulse detected by the second strain sensor 776b to eliminate any effect on the torsion bob other than the rheological properties of the fluid.

What is claimed is:

1. A system, comprising:
   a rheometer located within a hazardous location and comprising no electrical connections and further comprising:
     a housing comprising a fluid inlet and a fluid outlet;
     a cylinder comprising a cavity located to receive fluid that passes into the fluid inlet;
     a fluid motor operable to rotate the cylinder; and
     a torsion bob located within the cavity;
   a controller located outside of the hazardous location and operable to send and receive non-electrical optical signals to and from the rheometer in the hazardous location without an electrical connection, comprising:
     a pressure regulator configured to pressurize fluid to power the motor;
     a rotation monitor configured to receive an optical rotation signal indicating a rotation speed of the cylinder; and
     a torque sensor configured to receive an optical torque signal indicating a torque on the torsion bob;
   a rotation optical fiber configured to convey the optical rotation signal to the rotation monitor; and
   a torque optical fiber between the torsion bob and the torque sensor and configured to detect the torque on the torsion bob and convey the optical torque signal to the torque sensor,
   wherein the controller is operable to control rotation of the cylinder using the pressure regulator, determine a speed of rotation of the cylinder from the optical rotation signal and a torque on the torsion bob from the optical torque signal, and calculate a shear stress for the fluid based on the speed of rotation and the torque.

2. The system of claim 1, wherein the optical rotation signal comprises pulses of light reflected from a monitoring wheel rotating with the motor.

3. The system of claim 1, wherein the torque optical fiber comprises a mirror at an end adjacent the torsion bob that rotates with the torsion bob.

4. The system of claim 1, wherein the torsion bob rotates independent of the torque optical fiber.

5. The system of claim 4, wherein the torque optical fiber extends or contracts with temperature.

6. The system of claim 1, wherein the torque optical fiber comprises a fiber Bragg grating.

7. The system of claim 1, comprising a second torque optical fiber between the torsion bob and the torque sensor, wherein the torque optical fiber optic rotates with the torsion bob and the second torque optical fiber does not rotate with the torsion bob.

8. The system of claim 1, wherein the torsion bob rotates the torque optical fiber to attenuate the optical torque signal.

9. The system of claim 1, wherein the hazardous location comprises a rig site, a mud pit, a mud pit room, or combinations thereof.

10. A method, comprising:
controlling a rheometer within a hazardous location using a controller located outside the hazardous location without an electrical connection to operate a motor to rotate a cylinder within a cavity of the rheometer to rotate a fluid to impart a torque on a torsion bob within the cavity;
determining a speed of rotation of the cylinder with the controller based on a non-electric optical rotation signal received by the controller through a rotation optical fiber indicating the rotation of the cylinder without an electrical connection within the hazardous location;
determining, with the controller, the torque on the torsion bob from the rotation of the fluid based on a non-electric optical torque signal received by the controller through a torque optical fiber indicating the torque on the torsion bob without an electrical connection within the hazardous location; and
determining, using the controller located outside of the hazardous location, a shear stress of the fluid based on the speed of rotation of the cylinder and the torque on the torsion bob.

11. The method of claim 10, comprising adjusting the operation of the motor based on the determined speed of rotation of the cylinder.

12. The method of claim 10, comprising detecting a temperature within the cylinder with an optical temperature sensor.

13. The method of claim 10, wherein determining the torque on the torsion bob comprises propagating a pulse of light from the controller through the torque optical fiber to the torsion bob, adjusting the pulse of light based on the torque of the torsion bob, and returning the pulse of light to the controller.

14. The method of claim 13, wherein adjusting the pulse of light comprises attenuating the pulse of light.

15. The method of claim 13, wherein adjusting the pulse of light comprises shifting a primary wavelength through a fiber Bragg grating based on a strain of the fiber Bragg grating.

16. The method of claim 10, comprising changing operating parameters for a drilling operation to stay within an operating window for a drilling operation.

17. The method of claim 10, wherein the hazardous location comprises a rig site, a mud pit, a mud pit room, or combinations thereof.

* * * * *